July 28, 1959     H. RINIA     2,896,451
DEVICE FOR MEASURING THE FLOW SPEED OF A LIQUID
Filed June 8, 1956
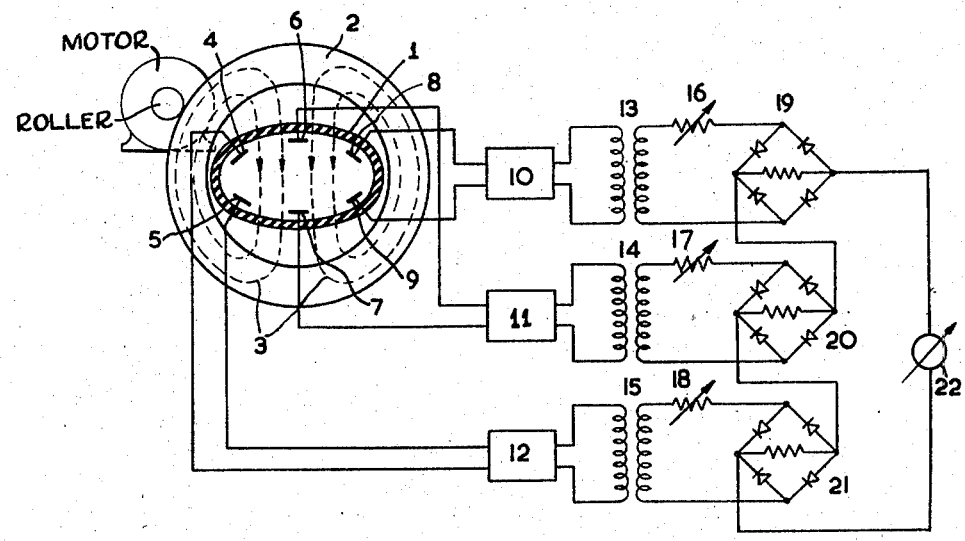
INVENTOR
HERRE RINIA
BY
AGENT

United States Patent Office 2,896,451
Patented July 28, 1959

2,896,451

DEVICE FOR MEASURING THE FLOW SPEED OF A LIQUID

Herre Rinia, Eindhoven, Netherlands, assignor, by mesne assignments, to North American Philips Company, Inc., New York, N.Y., a corporation of Delaware Application June 8, 1956, Serial No. 590,270

Claims priority, application Netherlands June 17, 1955

3 Claims. (Cl. 73—194)

The present invention relates to a device for measuring the flow speed of a liquid.

It is known to measure by electrical means the speed of flow of an electrically conductive or semiconductive liquid in a line by utilizing the phenomenon that in an electric lead moving in a magnetic field, an electromotive force is induced, the value of which is proportional to the speed of movement of the conductor.

In known devices based on this principle the liquid flows through a line placed in a homogeneous magnetic field, so that its axis is at right angles to the lines of force of the field. Arranged diametrically in opposition in the wall of the line are two electrodes, the connecting line of which is about at right angles to the lines of force. Due to the flow of the liquid, a voltage is induced between said electrodes, which is substantially proportional to the speed of flow of the liquid and which is measured.

In order to avoid the influence of polarization of the electrodes, it is also known to utilize an alternating magnetic field instead of a constant magnetic field. In this case it is necessary to take particular steps for compensating the electromotive force induced in the measuring circuit, by means of a transformer which is the electromotive force induced in the measuring circuit by the alternating field, even if the liquid does not flow. However, an advantage is that the voltage produced as a result of the liquid flow is an alternating voltage, which may be amplified in a simpler way than a direct voltage. The amplified voltage, after being rectified, is measured by means of a direct current meter. The alternating magnetic field is produced in a laminated magnetic circuit including an energizing coil traversed by an alternating current which may be taken from the power supply source.

In known devices based on the principle described, the liquid line usually has a circular cross-section, the liquid flow in this case must have rotational symmetry.

The last-mentioned requirement is not always fulfilled in practice, so that in certain cases the measurement is inaccurate. The object of the invention is to provide a device, which permits obtaining more accurate measurement, even if the cross-section of the line is not circular.

Use is made of a device of the kind above described. The invention consists in that the field is a preferably bipolar rotational field and a plurality of pairs of electrodes are arranged in the line.

The rotational field may be produced in known manner by means of two or more windings arranged along the periphery of the line in relatively shifted positions, said windings being traversed by currents having a suitably chosen phase difference with respect to one another. The magnetic circuit in this case is preferably laminated. Instead thereof, a rotational magnetic field may be produced by means of a permanent magnet set into rotation. The magnet may be a known ferromagnetic compound permanently magnetized and having a high coercive force, which compound is substantially non-conductive.

The voltages set up across the pairs of electrodes, after being amplified, may be rectified and the rectified voltages may jointly act upon a measuring instrument.

The electrodes of each pair may be diametrically in opposition in the line. In many cases, such as for example, where the cross-section of the line is not circular, it is not possible to position the electrodes diametrically so it is preferable to position the electrodes in a different manner, such as positioning each pair of opposed spaced electrodes in a different longitudinal plane from the others, as shown in the figure. The speeds of flow of the liquid are different at the various pairs of electrodes. It is usually desired to measure the total amount of liquid flowing through the line per second. In order to ensure that the indication of the measuring instrument is substantially dependent only upon this, it is desirable that variable resistors should be included in the various measuring circuits, by means of which the output voltages of the various measuring circuits may be controlled by hand.

The various rectified voltages are preferably active in series in a circuit comprising a single measuring instrument. However, it is naturally also possible to measure each output voltage with the aid of a separate measuring instrument.

In order that the invention may be readily carried into effect, it will now be described with reference to the accompanying drawing, wherein the single figure is a schematic diagram of an embodiment of the device of the present invention.

A line 1, which is traversed by electrically conductive or semi-conductive liquid, is assumed to have a non-circular cross-section. Its wall consists of non-conductive material. By means of a magnetic system 2, on which energizing windings may be arranged, or which may comprise a rotary permanent magnet, a bipolar, preferably homogeneous magnetic rotational field is produced at the area, at which the speed of the flowing liquid is to be measured. The magnet 2 may be rotated, for example, by a motor driving a roller to produce a rotating magnetic field through the liquid. The course of the lines of force of the magnetic field at a given moment is indicated by dotted lines 3. A plurality of pairs of electrodes 4—5, 6—7 and 8—9 are provided in the line. Between each pair of electrodes an alternating voltage is produced as a result of the liquid flow at this area, the frequency of this voltage being determined by the rotational speed of the field and its amplitude being dependent upon the speed of flow and the strength of the field, but independent of the rotational speed thereof. During the measurement, the voltage is determined, which is dependent upon all of electromotive forces induced between the pairs of electrodes.

For this purpose, the pairs of electrodes are connected to amplifiers 10, 11 and 12, respectively, the output voltages of which are applied via transformers 13, 14 and 15, respectively, to rectifiers 19, 20 and 21, respectively, in full wave bridge connection. The output voltages act in series upon an indicating instrument 22. Resistors 16, 17, 18 serve to enable the output voltages to be matched to the liquid flows at the associated pairs of electrodes, so that the indication of the meter 22 under any conditions gives an optimum indication of the total amount of liquid flowing through the line per unit-time.

While the invention has been described by means of a specific example and in a specific embodiment, I do not wish to be limited thereto, for obvious modifications will occur to those skilled in the art without departing from the spirit and scope of the invention.

What is claimed is:

1. A device for measuring the flow speed of a liquid flowing through a liquid conducting line, comprising means for producing a rotating magnetic field through said liquid at substantially right angles to the axis of said line, and means for measuring the electromotive force produced by the flow of said liquid in said magnetic field comprising a plurality of pairs of opposed spaced electrodes positioned in said liquid within said line, each of said pairs of electrodes being positioned in a different longitudinal plane from the others of said pairs of electrodes, means for rectifying the voltage across each of said pairs of electrodes, voltage indicating means, and means for simultaneously applying the rectified voltages in series combination across said indicating means.

2. A device for measuring the flow speed of a liquid flowing through a liquid conducting line, comprising means for producing a bipolar rotating magnetic field through said liquid at substantially right angles to the axis of said line, and means for measuring the electromotive force produced by the flow of said liquid in said magnetic field comprising a plurality of pairs of opposed spaced electrodes positioned in said liquid within said line, each of said pairs of electrodes being positioned in a different longitudinal plane from the others of said pairs of electrodes, means for amplifying the voltage across each of said pairs of electrodes, mean for rectifying the voltage across each of said pair of electrodes after amplification, variable resistance means interposed between the output of each of said amplifyingfi means and the input of each of said rectifying means, voltage indicating means, and means for simultaneously applying the rectified voltages in series combination across said indicating means.

3. A device for measuring the flow speed of a liquid flowing through a liquid conducting line, comprising means for producing a bipolar rotating magnetic field through said liquid at substantially right angles to the axis of said line, and means for measuring the electromotive force produced by the flow of said liquid in said magnetic field comprising a plurality of pairs of opposed spaced electrodes positioned in said liquid within said line, each of said pairs of electrodes being positioned in a different longitudinal plane from the others of said pairs of electrodes, said electrodes being coplanar in a substantially transverse plane, means for amplifying the voltage across each of said pairs of electrodes, means for rectifying the voltage across each of said pairs of electrodes after amplification, variable resistance means interposed between the output of each of said amplifying means and the input of each of said rectifying means, voltage indicating means, and means for simultaneously applying the rectified voltages in series combination across said indicating means.

References Cited in the file of this patent

UNITED STATES PATENTS

| 2,722,122 | Soffel | Nov. 1, 1955 |
| 2,766,621 | Raynsford et al. | Oct. 16, 1956 |

FOREIGN PATENTS

| 841,613 | Germany | June 16, 1952 |